No. 699,200. Patented May 6, 1902.
S. A. LORING.
SEED DROPPER.
(Application filed Aug. 18, 1900.)
(No Model.) 2 Sheets—Sheet 1.

Witnesses
Simeon A. Loring, Inventor
by C. A. Snow & Co.
Attorneys

THE NORRIS PETERS CO., PHOTO-LITHO., WASHINGTON, D. C.

No. 699,200. Patented May 6, 1902.
S. A. LORING.
SEED DROPPER.
(Application filed Aug. 18, 1900.)
(No Model.) 2 Sheets—Sheet 2.
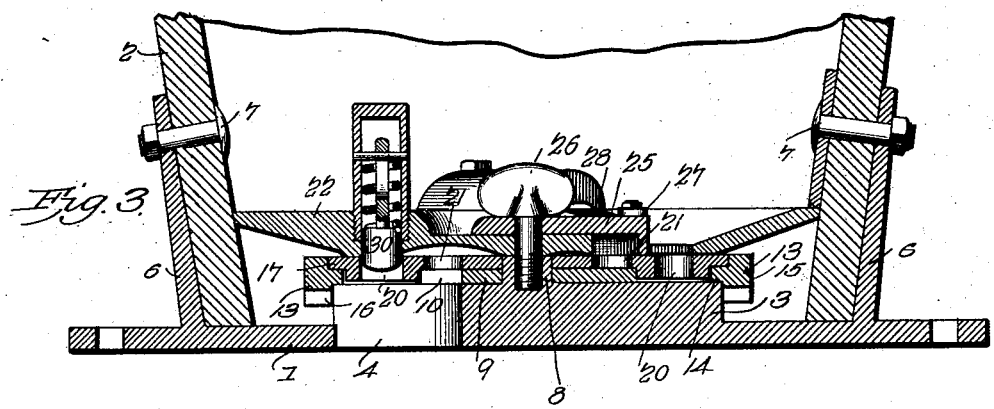
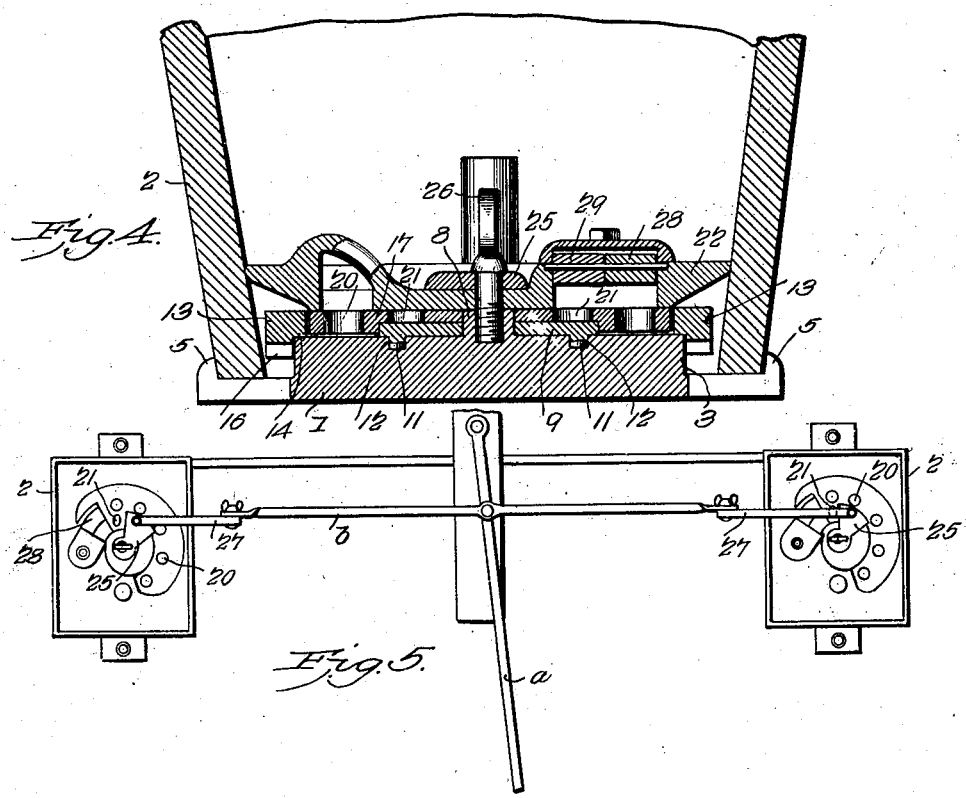
Witnesses Simeon A. Loring, Inventor
by C. A. Snow & Co.
Attorneys

UNITED STATES PATENT OFFICE.

SIMEON ALONZO LORING, OF KENTLAND, INDIANA.

SEED-DROPPER.

SPECIFICATION forming part of Letters Patent No. 699,200, dated May 6, 1902.

Application filed August 18, 1900. Serial No. 27,311. (No model.)

*To all whom it may concern:*

Be it known that I, SIMEON ALONZO LORING, a citizen of the United States, residing at Kentland, in the county of Newton and State of Indiana, have invented a Combined Apportionate Seed-Drop, of which the following is a specification.

My invention is an improved seed-dropping mechanism for corn-planters; and it consists in the peculiar construction and combination of devices hereinafter fully set forth and claimed.

The object of my invention is to provide means for varying the number of seeds planted in the hills according to the quality of the soil, so that the planter may be caused to drop a greater number of seeds in the hills in the richer portion of a field than in the hills in the poorer portion thereof to secure a crop equal to the full capacity of the soil.

A further object of my invention is to effect improvements in the construction of the revoluble seed-disk, so that the same is rendered interchangeable at will.

Figure 1:
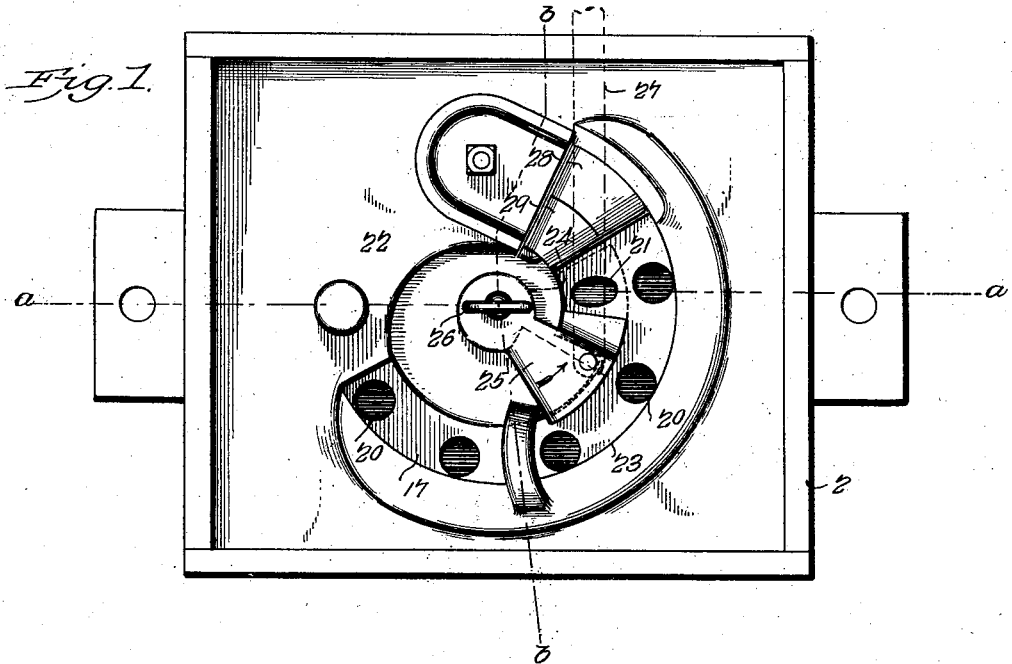
Figure 2:
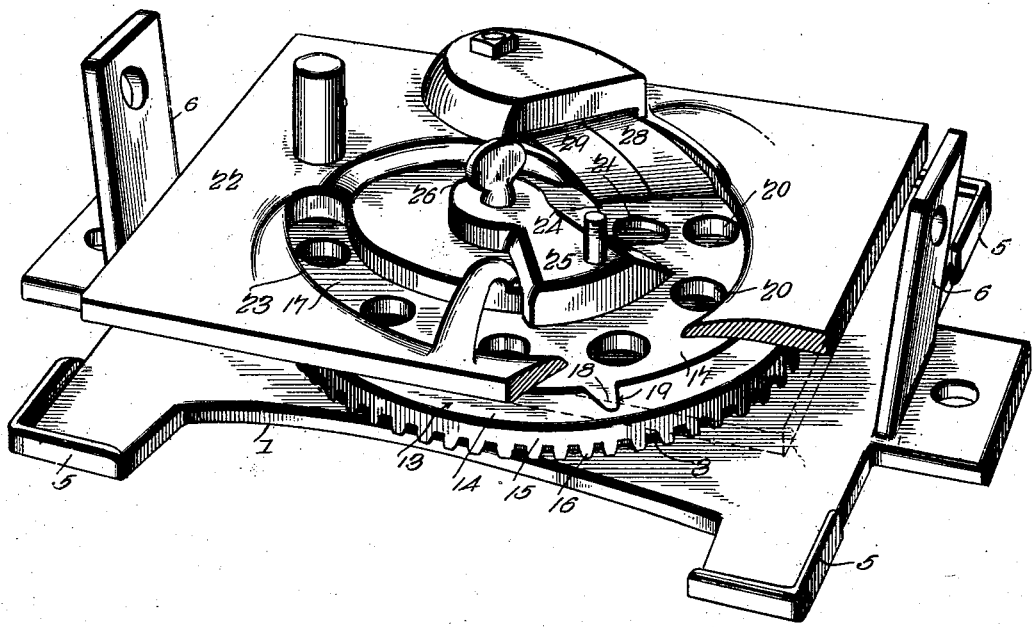

In the accompanying drawings, Figure 1 is a top plan view of a seed-dropping mechanism embodying my improvements, showing the valve which coacts with the secondary seed-openings open in full lines and closed in dotted lines. Fig. 2 is a detail sectional perspective view taken on a plane intersecting the bottom of the hopper and the revoluble seed-disk. Fig. 3 is a vertical sectional view taken on a plane indicated by the line *a a* of Fig. 1. Fig. 4 is a similar view taken on a plane indicated by the line *b b* of Fig. 1. Fig. 5 is a top plan view showing means for shifting the valves for the secondary seed-openings.

The base-plate 1, which supports the seed-box or hopper 2, is provided on its upper side with a centrally-disposed circular boss 3, on the rear side of which is an opening 4, through which the seeds are dropped into the usual seed-spout. The said base-plate is provided at its corners with flanges 5 to engage the corners of the hopper or seedbox and is provided at its front and rear sides with lugs 6, which bear against the front and rear sides of the seedbox on the outer sides thereof, the seedbox being secured to the said lugs 6 by suitable bolts 7, as shown. The boss 3 has on its upper side a central vertical projection 8, on which is fitted a removable disk 9, which forms a spacing-disk, which disk bears on the boss 3, has a notch 10 in its rear side that is coincident with the front end of the opening 4, and said space-disk is provided on its lower side with dowels 11, which enter openings 12 in the boss 3, thereby securing said space-disk against rotation on the said boss. The diameter of the space-disk is considerably less than that of the boss. A gear-ring 13 is revoluble on the boss 3, having an inwardly-extending flange 14, which bears on the upper side of said boss, and a downwardly-extending flange 15, provided with crown-teeth 16. The said crown-teeth are engaged by the usual pinion (not here shown) of the power mechanism of the planter to rotate the said gear-ring when the planter is in operation. The seed-disk 17 is fitted in and detachable from the gear-ring. The said seed-disk bears on the space-disk and is provided with a pair of peripheral studs 18, which enter notches 19 in the flange 14 of the gear-ring, whereby the said seed-disk is caused to rotate with the said gear-ring. The said seed-disk is provided with a series of primary seed-openings 20, of which there are any suitable number and which primary seed-openings may be of any suitable size to contain as many grains of corn as are suitable for planting in a hill in soil of ordinary quality as to richness. The said primary seed-openings are concentric with the axis of said seed-disk. The latter is further provided with a concentric series of secondary seed-openings 21, which aline radially with the primary seed-openings and are here shown as disposed between said primary seed-openings and the center of the said disk. The said secondary seed-openings are each of any suitable size; but I usually make said secondary openings each of a size suitable to contain a single grain of corn.

In practice I provide the seed-dropping mechanism with a series of the interchangeable seed-disks 17, in which the number and size of the primary and secondary seed-openings are varied to suit the requirements of all soils. It will be understood that during the rotation of the seed-disk each of its primary and secondary seed-openings pass over and register with the opening 4 in the bottom plate 1 in succession.

The seedbox or hopper is provided with a removable bottom plate 22, which has a centrally-disposed segmental opening 23, which is concentric with the axis of the seed-disk and uncovers a number of the primary seed-openings thereof. At one end of the said segmental opening, which I will term the "rear" end thereof, the same is widened, as at 24, to uncover one of the secondary seed-openings or, in other words, to uncover each of the secondary seed-openings in succession as the seed-disk rotates. A valve 25 bears on the said seed-disk and is disposed in the said widened portion of the said opening 23. The said valve is pivoted on the center of the bottom plate 22 by a bolt 26, which engages a threaded opening in the projection 8 of the boss 3. The said valve is adapted to be moved by a link 27, which passes through an opening on the inner side wall of the seedbox or hopper. When the said valve is in the position shown in full lines in Fig. 1, the secondary openings will be uncovered successively thereby and will become filled with grains of corn to be discharged, together with the grains which fill the primary seed-openings, and when thus disposed the secondary as well as the primary seed-openings are effective. When the said valve is moved to the position indicated in dotted lines in Fig. 1, it closes the secondary openings and renders the same ineffective, seeds being dropped then from the hopper only by the primary seed-openings of the seed-disk.

I provide a spring-pressed cut-off 28, which bears on the seed-disk at the rear end of the segmental opening 23 and under which cut-off the primary seed-openings of the revoluble seed-disk pass in succession, and I also provide a similar secondary cut-off 29, which bears on the seed-disk and under which the secondary seed-openings successively pass. It will be understood by an inspection of Fig. 1 of the drawings that all of the secondary seed-openings are covered by the central portion of the bottom plate 23 and the cut-off 29, save one, and that the said single secondary seed-opening may be covered or uncovered by the valve 25. It will be further understood that the primary seed-openings are effective under all conditions while the seed-disk is in rotation and that the secondary seed-openings are effective only when uncovered by the valve. The primary seed-openings drop the normal number of seeds in the hills, and when planting in soil of ordinary quality, as in the uplands, the secondary seed-openings are not brought into requisition and the valve remains closed. In planting in low lands and in portions of a field which are richer than other portions thereof the secondary seed-openings are also brought into requisition by opening the valve 25, hence causing the secondary seed-openings to operate simultaneously with the primary seed-openings to drop and increase the number of grains of corn in each hill in the richer land, where the soil is capable of maturing a heavier crop than in the poorer portions of the field. Hence by the use of my invention the number of seeds planted in the hills may be varied according to the varying conditions in the quality of the soil in different portions of a field.

In the rear side of the bottom plate 22 of the seedbox or hopper is a spring-depressed plunger 30, which successively registers with the primary seed-openings of the seed-disk as each of said openings registers with the opening 4 in the base-plate, the function of said plunger, as will be understood, being to descend in the seed-openings in succession as the same pass over the opening 4 to cause the seeds to be dropped from the said seed-openings.

In Fig. 5 of the drawings I show a portion of the frame of a corn-planting machine of ordinary construction provided with a pair of my improved seed-dropping mechanisms and I show a hand-lever $a$, which is connected to the links 27 of the valve 25 by a bar $b$. By this means the said valves of the said seed mechanisms may be readily set by the operator to bring the secondary seed-openings into requisition or to cut off the same from operation as the machine approaches rich or poor portions of a field.

I do not desire to limit myself to the precise construction and combination of devices hereinbefore shown and described, as it is evident that modifications may be made therein without departing from the spirit of my invention.

Having thus described my invention, I claim—

1. The combination of a seed-dropping element having a primary and a secondary seed-opening, with means to open and close said secondary feed-opening to render the same effective or ineffective at will, substantially as described.

2. The combination of a revoluble seed-dropping element having a primary seed-opening and a secondary seed-opening at different distances from the center thereof, and means to cover and uncover said secondary seed-opening at will, substantially as described.

3. The combination of a revoluble seed-dropping element having primary and secondary seed-openings and means to cover and uncover said secondary seed-openings to render the same effective or ineffective at will, substantially as described.

4. The combination of a revoluble seed-dropping element having primary and secondary seed-openings, a cut-off for said primary and secondary seed-openings and a valve to cover and uncover said secondary seed-openings to render the same effective or ineffective at will, substantially as described.

5. The combination of a ring-gear, a seed-disk revoluble therewith and detachably connected thereto, said seed-disk having a primary seed-opening and a secondary seed-opening at different distances from the center thereof, a cut-off, and a valve, to cover and uncover said secondary seed-opening at will, substantially as described.

6. The combination of a revoluble seed-dropping element having a primary seed-opening and a secondary seed-opening at different distances from the center thereof, a cut-off, a valve, pivotally mounted on the center of said seed-dropping element, and means to operate said valve, to cover or uncover said secondary seed-opening at will, substantially as described.

SIMEON ALONZO LORING.

Witnesses:
WILLIS KIRKPATRICK,
WHITE S. HARBISON.